UNITED STATES PATENT OFFICE.

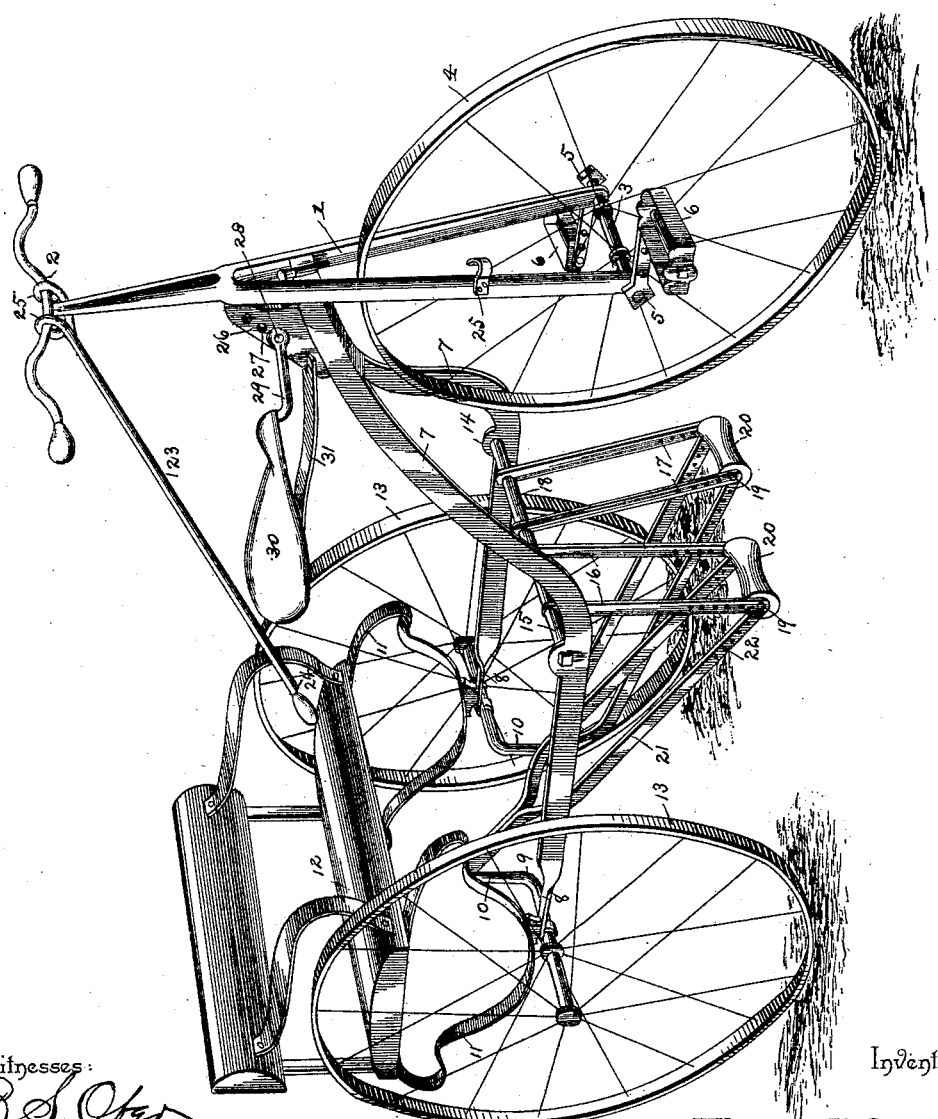

THOMAS R. CONNOR AND THOMAS D. CONNOR, OF WILKES-BARRÉ, PENNSYLVANIA.

VELOCIPEDE.

SPECIFICATION forming part of Letters Patent No. 452,541, dated May 19, 1891.

Application filed December 10, 1890. Serial No. 374,210. (No model.)

*To all whom it may concern:*

Be it known that we, THOMAS R. CONNOR and THOMAS D. CONNOR, citizens of the United States, residing at Wilkes-Barré, in the county of Luzerne and State of Pennsylvania, have invented a new and useful Velocipede, of which the following is a specification.

This invention has relation to improvements in velocipedes, the objects being to provide a velocipede of cheap, simple, and durable construction especially adapted to be manufactured for children and to accommodate and be operated by one or two riders, as may be desired, and also to provide a means of adjustment whereby the machine is adapted for riders of various length of legs.

Other objects and advantages of the invention will appear in the following description, and the novel features will be particularly pointed out in the claims.

In the drawing we have illustrated a perspective of a velocipede constructed in accordance with our invention.

In practicing our invention we employ the usual inverted-V-shaped front fork 1, at the upper end of which is affixed the transverse handle-bar 2, terminating in handles or grips designed to be grasped by the hands of the front rider. In the lower ends of the fork 1 is journaled the front drive-shaft 3, upon which, between the bifurcations of the fork, is mounted the front wheel 4, and at each side of the fork the shaft is provided with ordinary cranks 5, upon which are adjustably mounted propelling-pedals 6.

Pivoted at their front ends at the fork 1 is a pair of downwardly and rearwardly disposed side bars 7, which, near their rear ends, are given a quarter-twist to form plates 8, clipped to a rear axle 9, which, between the clips, is provided with a pair of oppositely-disposed cranks 10.

Secured to the plates 8 of the side bars 7 is a pair of elliptical springs 11, upon which is mounted a rear seat 12, provided with the usual back and side arms or otherwise finished, as may be desired. The outer ends of the axle 9 carry rear drive-wheels 13, which are rigidly mounted upon the axle, so that they revolve in unison and with the rotations of the axle. The upper edges of the bars 7, in rear of the front wheel 4, are provided with bearings 14 and are connected by means of a transverse rod 15, upon which are loosely suspended two pairs of suspension-straps 16, said straps being perforated to form adjusting-holes 17 near their lower ends and being spaced apart upon the rod by means of tubular sleeves 18. The straps are connected in pairs by means of transverse bolts 19, passed through any pair of their openings, and upon the bolts, between each pair of straps, is mounted loosely a spool-shaped pedal 20.

21 designates a bifurcated pitman or connecting-rod, of which there are two, the rear end of each connecting-rod being loosely coupled with a crank 10 of the axle 9 and having its bifurcated front end loosely connected with one of the bolts 19, before mentioned. The bifurcations of the rods 21 are also provided with a series of perforations or adjusting-holes 22, so that the length of stroke of the rear pair of operating-pedals may be regulated to accommodate itself to the length of the leg of the rider.

23 designates a guide-rod or handle bifurcated at its front end to embrace the handle-bar 2 at each side of the head of the fork 1, and terminates at its rear end in a suitable handle 24, located within easy reach of a person occupying the rear seat of the machine. The handle 23 is intended for use when but one rider is using the machine and is seated in the rear seat 12. When, however, the machine is operated by two riders, which may be accomplished, as will hereinafter appear, the handle 23 is swung to the front of a spring-clip 25, secured to one of the bifurcations of said front fork.

The front frame formed by the bars 7 is provided with the usual flanged neck 26, which in this instance is somewhat enlarged, and is provided with a series of transverse perforations 27, designed to receive an adjusting-bolt 28, which projects at both sides of the flange 26. A forked seat-supporting standard 29 embraces the flange 26, and the bolt 28, before mentioned, serves to adjustably connect the forked end of the brace with the flange. By the bolt 28 the seat or saddle 30, mounted upon the rear end of the brace 29, is pivoted in position, and is yieldingly supported in this instance by means of a flat spring 31, having its rear end secured to the under side of the saddle 30 and its front end recessed or forked to bear against the edge of the flange 26.

The operation of our invention will be readily understood from the foregoing description, taken in connection with the drawing, and it will be apparent that the velocipede is adapted to receive and to be operated by either one or two riders, and that its steering mechanism may be easily adapted to be operated by the rider at the front or rear.

The construction of our invention is such as to specially adapt it for children and permits of its production at a reasonable cost. With slight modifications the machine may be also manufactured in the higher grades.

Having described our invention, what we claim is—

1. In a velocipede, the combination, with the front fork, the axle mounted therein, the front wheel, and pedals mounted upon the axle, of a rear frame-work, a crank-axle journaled therein and provided with a pair of central cranks and at its outer end with drive-wheels, a seat supported upon the frame-work near its rear end, a front seat supported by the frame-work near its front end, a handle-bar mounted upon the fork and adapted to be operated from the front seat, opposite pairs of pivoted straps, pitmen connecting each pair of straps with one of the cranks of the rear axle, and treadles located at the points of connection between the pitmen and the straps, substantially as specified.

2. In a velocipede, the combination, with the front fork terminating at its upper end in a head, the handle-bar mounted upon the head, the front axle journaled in the lower end of the fork, the cranks thereon, pedals adjustably mounted upon the cranks, and the front wheel mounted upon the axle between the cranks, of the rearwardly-disposed bars 7, pivoted at their front ends to the fork, the axle 9, connected to the rear ends of the bars and provided with intermediate cranks, the wheels 13, mounted upon the ends of the axle, the bearing-rod 15, connecting the bars 7, the pairs of straps 16, loosely suspended from the bars and having perforations 17, the bifurcated pitmen or connecting-rods 21, loosely connected at their rear ends to the cranks of the rear axle and provided at their front ends with perforations, the bolts 19, connecting the front ends of said rods with the straps, spools mounted on the bolts, the flange 26, located at the upper end of the bars 7 and provided with perforations 27, the bifurcated brace 29, embracing the flange, the bolt 28, adjustably connecting the brace and flange, the saddle 30, the spring 31, secured at its rear end to the saddle and at its front end bifurcated to embrace the flange, and the seat 12, suitably supported by and secured to the rear ends of the bars 7, substantially as specified.

3. In a velocipede, the combination, with the front fork, its axle, wheel, and handle-bar, of the rearwardly-disposed frame, the cranked axle mounted therein, the rear seat mounted upon the frame, the treadles connected to the rear axle and pivoted to the frame, the handle 23, pivoted to the handle-bar of the front fork and terminating adjacent to the rear seat, and the spring-clips 25 for locking the handle, substantially as specified.

In testimony that we claim the foregoing as our own we have hereto affixed our signatures in presence of two witnesses.

THOMAS R. CONNOR.
THOMAS D. CONNOR.

Witnesses:
E. V. JACKSON.
ELIAS COHEN.